United States Patent
Barth et al.

(10) Patent No.: US 8,553,281 B2
(45) Date of Patent: Oct. 8, 2013

(54) HIGH DENSITY, HIGH INTENSITY INK FORMULATION AND METHOD FOR PRINTING HIGH INTENSITY COLORS

(75) Inventors: Thomas Michael Barth, Oxford, OH (US); Jeffrey William Thompson, Lemont, IL (US)

(73) Assignee: Alpha Technologies Inc., Countryside, IL (US)

( * ) Notice: Subject to any disclaimer, the term of this patent is extended or adjusted under 35 U.S.C. 154(b) by 779 days.

(21) Appl. No.: 12/630,716

(22) Filed: Dec. 3, 2009

(65) Prior Publication Data

US 2010/0141973 A1 Jun. 10, 2010

Related U.S. Application Data

(60) Provisional application No. 61/120,205, filed on Dec. 5, 2008.

(51) Int. Cl.
*G06F 15/00* (2006.01)
*C09D 15/00* (2006.01)

(52) U.S. Cl.
USPC ........................................ 358/1.9; 106/31.61

(58) Field of Classification Search
USPC ............. 428/211.1; 358/1.9; 106/31.64, 31.9, 106/31.65, 31.61, 31.08, 31.28, 31.34
See application file for complete search history.

(56) References Cited

U.S. PATENT DOCUMENTS

| | | | |
|---|---|---|---|
| 4,560,997 A | 12/1985 | Sata et al. | |
| 4,604,654 A | 8/1986 | Sakurada et al. | |
| 4,672,432 A | 6/1987 | Sakurada et al. | |
| 4,959,659 A | 9/1990 | Sasaki et al. | |
| 5,795,082 A | 8/1998 | Shimada et al. | |
| 6,063,176 A * | 5/2000 | Lyen | 106/31.61 |
| 6,808,258 B2 | 10/2004 | Kaga et al. | |
| 6,932,467 B2 | 8/2005 | Kawamura | |
| 7,172,651 B2 | 2/2007 | Chen et al. | |
| 7,237,872 B1 | 7/2007 | Spehrley et al. | |
| 7,407,706 B2 | 8/2008 | Miyabayashi | |
| 7,417,074 B2 | 8/2008 | Hiroki et al. | |
| 8,157,905 B2 * | 4/2012 | Lewis et al. | 106/31.64 |
| 2003/0069328 A1 * | 4/2003 | Fukuda et al. | 523/160 |
| 2010/0059691 A1 * | 3/2010 | Lewis et al. | 250/473.1 |
| 2010/0181753 A1 * | 7/2010 | Magnin et al. | 283/71 |

FOREIGN PATENT DOCUMENTS

| | | |
|---|---|---|
| JP | 2001171154 A | 6/2001 |
| WO | 2007088733 A1 | 8/2007 |

* cited by examiner

*Primary Examiner* — Jerome Grant, II

(74) *Attorney, Agent, or Firm* — Levenfeld Pearlstein, LLC

(57) ABSTRACT

A high intensity ink solution includes a letdown varnish of about 50% to 58% by weight, a dispersion oil of about 8% to 15% by weight, a pigment about 18% to 25% by weight, a wax compound of about 4% to 10% by weight, and a drier compound of about 1%-3% by weight. A method of producing high intensity color prints includes generating a color space and placing the color space in a CMYK file, generating a color proof, then generating at least four printing plates, and configuring a printer to print specific color densities to accurately match the color proof. Densities of pigments, such as yellow, magenta, cyan, and black are included in the inks, creating color which is perceived more strongly with less dots per area than currently available inks.

11 Claims, 1 Drawing Sheet

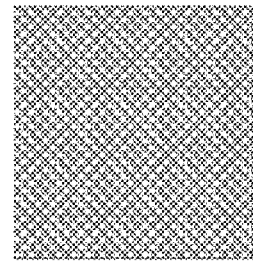
FIG. 1
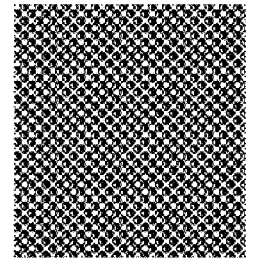
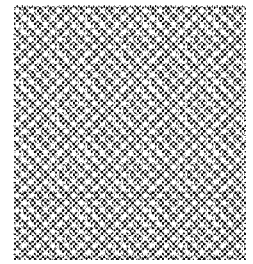
FIG. 2A  FIG. 2B
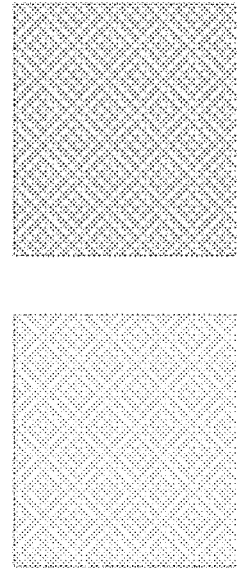
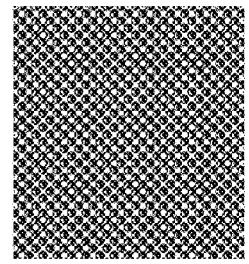
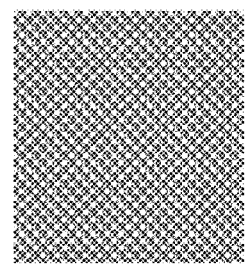
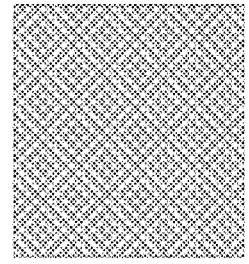
FIG. 3A  FIG. 3B  FIG. 3C  FIG. 3D  FIG. 3E

HIGH DENSITY, HIGH INTENSITY INK FORMULATION AND METHOD FOR PRINTING HIGH INTENSITY COLORS

CROSS-REFERENCE TO RELATED APPLICATION

This application claims the benefit of priority of Provisional U.S. Patent Application Ser. No. 61/120,205, filed Dec. 5, 2008, entitled "HIGH DENSITY, HIGH INTENSITY INK FORMULATION AND METHOD FOR PRINTING HIGH INTENSITY COLORS".

BACKGROUND OF THE INVENTION

The present high intensity ink formulation is directed to printing in color. More particularly, the present high intensity ink formulation is directed to improved inks and a method for using the same to more accurately reproduce the colors of a subject in print media.

The printing industry attempts to reproduce images, pictures, and letters on a substrate to represent, as closely as possible, the colors of the original subject, whether the source of that subject is presented in a photograph, transparency, drawing, or painting. Unfortunately, the colors as viewed on a computer screen or a camera often are not what is finally printed on paper. For example, colors appear different on uncoated, coated, or matte stock paper. Similarly, the color on a digital screen may appear different than the color as it prints from, for example, an ink-jet printer on to paper. This is due to different color models being used to reproduce color in different media. A color model describes the way in which primary or base colors can be added or subtracted to form a variety of different colors. Examples of color models are the RGB color model and the CYMK color model.

Each color model has an associated color space chart in which the various colored areas ("color spaces") that form the chart are the variations in color produced through mixing of the base or primary colors in the associated color model. The color space chart produced for each color model is made from a balance of inks with specific hues, at specific densities, at specific gain in dot values.

The process of creating a picture or photograph on print media first starts with a digital RGB model file from an electronic device, for example, a camera. RGB refers to red, green, and blue, the three hues of light that can be mixed to form the different color spaces in the RGB color space chart. The RGB model is commonly used in televisions, computer monitors, and computerized technology such as digital cameras.

A printer, however, uses a different color model, the CYMK color model. The CYMK model has base or primary colors of cyan, yellow, magenta, and black, which are used to create color images on a physical substrate such as paper, rather than red, green, and blue. Thus, to convert a digital image to a physical print image, the camera file, that is in terms of the RGB model, is converted to a CYMK model file, a file extension associated with raw cyan, magenta, yellow, and black samples. This CMYK file is then used to produce a color space chart file for printing the subject.

To reproduce a digital picture in physical print, a digital file of an image/picture is generated from a digital scanner or camera. This file is stored in the form of a Tiff, Jpeg or a RAW. A new color space pallet is generated on a printing press and the printing inks generally fall into a specific tolerance. The new color space is then scanned and manipulated to a specific tolerance and placed into a CMYK file. A color proof is then generated of the subjects through the manipulated color space file on a jet printer. The CMYK file is then used to generate four printing plates. The plates are put on a printing press and the inks used must have the same specifications as the one used to generate the color space chart. The printing press is, typically, set up to print specific color densities, at a specific dot gain value, in order to match the color proof.

Unfortunately, because of the different base or primary colors in each of the models, the shades and hues of similar colors may be subtly different in each color chart. For example, an apple may appear brighter or be slightly more orange in the RGB model than in the CMYK model or as compared to real life. This is due to the electronic medium imposing its own color palette and criteria for representation of the subject's colors that may not be compatible, acceptable, or appropriate for the printer in order to adequately or correctly reproduce the subject in physical print.

The printing industry has criteria that are used to determine the how accurately a color in one medium represents a subject of another medium. The printing industry uses "CIELAB" (also CIE L*A*B*) to determine the accuracy or perceptual continuity of the reproduced colors. CIELAB is a "perceptual color fidelity" metric, measuring how accurately the reproduction of a color is to the original subject when viewed by a human observer. It assigns a numerical value to a color to achieve balanced tones and match colors of a given picture.

CIELAB (also CIE L*A*B*) classifies color spaces by, among other things, associating tristimulus values with each color. A tristimulus value of a color is the amount of the three base/primary colors in a three-component additive color model needed to match a particular test color. An advantage to the CIELAB technique is that all color values can be calculated from the tristimulus values.

Another advantage of using CIELAB measurements is that it has the ability to compare color to color by their differences. Differences can be measured for a control color and a trial color. The distance between the two sets of color coordinates in a given three dimensional color space chart represents the color difference.

In printing, the ink film and density are controlled so as to allow for the optimum perceptual continuity or accuracy of reproduction. Color discrimination is also determined by the thickness and density of the ink applied to the substrate. Ink is measured on a printing press by a metric value based on mils (millimeters) (1 mil=$\frac{1}{1000}$ of an inch or 0.001 inch). The thickness of the ink film on the printing press rollers is a guide to establish all of the mechanical functions of a printing ink. The ink film determines the strength, cure rate, rub resistance, and the dot structure on a substrate. The majority of printing inks are setup to print within the range of 0.20 mil to 0.50 mil. When inks fall within this range, the print characteristic are within the tolerance of acceptable performance. The following Table 1 lists the general performance characteristics of differing thicknesses of ink:

TABLE 1

| Thickness of Ink | Type of Ink Printed | Characteristics |
| --- | --- | --- |
| .20-.30 mil | Light ink film | Sharp dots reproduction; may have control and rub-resistance issues |
| .30-.40 mil | Medium ink film | Produces acceptable SWOP(standard web offset printing) dot reproduction: acceptable set and rub-resistance |

TABLE 1-continued

| Thickness of Ink | Type of Ink Printed | Characteristics |
|---|---|---|
| .40-.50 mil | High ink film | Acceptable color; generally unacceptable dot reproduction and potential to smear/dry improperly |

The densitometer assigns numbers to density variations by quantifying the amount of light that is reflected from the surface of the color being measured. The densitometer gives a numerical reference to the amount of reflected light. For example, a reading of 0.00 indicates that 100% of the light has been reflected by the sample color. A reading of 1.00 indicates that 10% of the light is reflected. A reading of 2.00 indicates that only 1% of the light has been reflected. The logarithmic differences measured are important in determining the amount of color needed to develop a balanced picture on a printing press.

Dot value is also used as a measurement for color. For example a dot value of 50% refers to a measured color space of a color chart, wherein 50% of that space is color and 50% is white, an enlarged example of which is illustrated in FIG. 1.

The following TABLE 2 illustrates the densitometer readings for various thicknesses of ink, using Process Magenta, as the ink.

TABLE 2

| Densitometer Reading | Thickness of ink in mils | % Gain in representation of color |
|---|---|---|
| 1.30-1.40 | .20-.25 | 10% |
| 1.40-1.50 | .26-.31 | 15% |
| 1.50-1.60 | .32-.37 | 20% |
| 1.60-1.70 | .38-.43 | 30% |
| 1.70-1.80 | .44-.49 | 40% |
| 1.80-1.90 | .50-.55 | 50% |

Table 2 illustrates that the thicker the ink, the more accurately the ink represents the true or original subject color. An illustration of an example is in FIGS. 2A and 2B, where the dot value for both FIGS. 2A and 2B is 50%, but the thickness of the ink in FIG. 2B is thicker than FIG. 2A, and is perceived as more intense. However, when the ink thickness is increased, the mechanics and measurements, such as visual perception, ink mileage/consumption, set rub, and the like of the printing ink change exponentially.

Currently, in order to increase the visual perception of accurate representation of a printed picture using current ink and print technology, an increase in ink film thickness and density are required. This involves, however, running current print and ink technology out of currently acceptable standards, and negatively impacting the set rate, rub resistance, and dot structure of the ink.

Accordingly, there is a need to increase the color density or intensity of a printing ink, while maintaining its physical properties. The new color density, desirably, is perceived with greater ease than current color densities, and does not compromise the dot structure, rub resistance, smear resistance, or increase consumption of ink.

BRIEF SUMMARY OF THE INVENTION

A high concentrated ink solution includes a letdown varnish of about 50% to 58% by weight, a dispersion oil about 8% to 15% by weight of the ink solution, a pigment of about 18% to 25% by weight, a wax compound of about 4% to 10% by weight, and a drier compound of about 1%-3% by weight.

The high intensity ink for process yellow with a viscosity of about 170-220 and a tack of about 11-13 includes a let down varnish of about 54% to 58% by weight, and a yellow pigment of about 18%-23% by weight.

The high intensity ink for process magenta with a viscosity of about 170-220 and a tack of about 14-16 includes a let down varnish of about 54%-58% by weight and a red pigment of about 20%-25% by weight.

The high intensity ink for process cyan with a viscosity of about 170-220 and a tack of about 16-18 includes a let down varnish of about 54%-58% by weight, and a blue pigment of about 20%-25% by weight.

A high intensity ink for process black having a viscosity of about 170-220 and a tack of about 15-17 includes a let down varnish of about 54%-58% by weight, a dispersion oil of about 8%-15% by weight, a alkali blue pigment of about 3%-6% by weight, a carbon black pigment of about 17%-20% by weight, a wax compound of about 4-10% by weight, and a drier compound of about 1%-3% by weight.

A method of producing high intensity color prints includes generating a color space and placing the color space in a CMYK file, generating a color proof, using the color proof to generate at least four printing plates, configuring a printer to print specific color densities to accurately match the color proof, and matching the color proof.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein:

FIG. 1 is a representation of a color space of a color chart having a dot structure;

FIGS. 2A and 2B are representations of color spaces having the same dot values and different thicknesses; and FIGS. 3A-3E are representations of a span of color spaces in a color chart using the present high intensity inks, the color spaces representing increasing dot values, in accordance with the principles of the present invention.

DETAILED DESCRIPTION OF THE INVENTION

While the present high intensity ink formulation is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

A high intensity ink includes an increased concentration of pigment in the ink. A method of using the high intensity inks creates a color space chart with more and improved color spaces to better and more accurately represent the colors of a subject in print media than is typically achieved using current inks, color models, and color space charts. The present high intensity ink formulation allows the printing industry to more accurately reproduce the red, green, blue color gamete created by cameras or other digital processing equipment.

High intensity ink is produced by increasing the pigment load in the primary ink colors used in the tristimulus values. When the pigment load in an ink is increased, the varying shades of color from that base pigment is exponentially increased. Thus, the combination of higher pigment load plus a larger color space allows printing of an image that is perceived to be more accurate color.

The present high intensity ink formulation and method of using same is designed to achieve the traditionally accepted values for such criteria as viscosity and density, for a printing ink, with an increase in the concentration of pigment in the ink and an increase in the perceptual accuracy of cyan, magenta, yellow, and black (CMYK), and their corresponding process inks by 14% to 25%, when compared to the traditional or standard printing color inks.

The following TABLE 3 compares color value differences, read with a densitometer, of the present high intensity inks versus standard inks:

TABLE 3

| G7 and SWOP (current standards) | High Intensity Ink Formulations: densitometer readings | % Increase of the density over industry standard |
| --- | --- | --- |
| Yellow density: 0.90-1.00 | Yellow density: 1.20-1.30 | 25% |
| Magenta density: 1.35-1.50 | Magenta density: 1.80-2.00 | 25% |
| Cyan density: 1.30-1.45 | Cyan density: 1.75-1.95 | 25% |
| Black density: 1.70-1.80 | Black density: 1.95-2.10 | 14% |

As the TABLE 3 above suggests, by increasing the density value reading on all of the colors, the color space has increased; therefore, the color space has grown "a new dimension" of color values. As represented in FIG. 3, for example, the color space chart has grown from 2 color spaces (as represented in FIG. 2) to 5 color spaces, because the dot values of the color spaces can be modified more. The new pigment densities for the present high intensity ink formulation creates a new end result effect for the printing process. The measurement for density: the L*, A*, B* values, as well as DC*, DH*, DL*, DA*, DB* values will be different, based on the new color space created by the higher densities of pigment in the ink. A larger gamete of color values is now created.

In the present high intensity ink formulation, all densitometer density value readings fall in the ranges of dry readings ("dry" refers to ink that has dried on or absorbed into a substrate) as shown in TABLE 4.

TABLE 4

| Color | Density Value Reading using Present high intensity ink formulation |
| --- | --- |
| Yellow | 1.15-1.30 |
| Magenta | 1.70-2.00 |
| Cyan | 1.65-1.95 |
| Black | 1.80-2.10 |

In addition, in the present high intensity ink formulation, the dot increase (the "spread" of an ink dot in an area) does not exceed a TVI (Total Value Increase) of the dots per square inch on a printed sheet, as shown in TABLE 5.

TABLE 5

| Range of Dot Values | Cannot increase more than | Total Value Increase in Linear dot value |
| --- | --- | --- |
| 01-10% | 2% | 03-12% |
| 11-20% | 3% | 14-23% |
| 21-30% | 4% | 25-34% |
| 31-40% | 4% | 35-44% |
| 41-50% | 5% | 46-55% |
| 51-60% | 5% | 56-65% |
| 61-70% | 4% | 65-74% |
| 71-80% | 4% | 75-84% |
| 81-90% | 3% | 84-93% |
| 91-100% | 2% | 93-100% |

A preliminary proof of solid colors using the present high intensity ink formulation and method, read with a densitometer, have the following ranges:

TABLE 6

| Color | Densitometer reading |
| --- | --- |
| Yellow | 1.25-1.30 |
| Magenta | 1.90-1.95 |
| Cyan | 1.85-1.90 |
| Black | 1.95-2.00 |

The CIE L*A*B* results are as follows in TABLE 7, on coated paper. Spectrophotometer dry readings are compared between standard\inks and the inks of the present high intensity ink formulation:

TABLE 7

| | L* | A* | B* |
| --- | --- | --- | --- |
| (a) Yellow (high intensity ink) | 84.5 | 3.35 | 108 |
| Yellow (standard): | 89 | −5 | 93 |
| (b) Magenta (high intens. ink): | 40.2 | 68.9 | 18.55 |
| Magenta (standard): | 48 | 74 | −3 |
| (c) Cyan (high intensity ink): | 49.5 | −41.5 | −50.5 |
| Cyan (standard): | 55 | −37 | −50 |
| (d) Black(high intensity ink): | 10.25 | −1.45 | −3.5 |
| Black(standard): | 0 | 0 | 16 |
| (e) Orange(high intensity ink): | 40.25 | 62.5 | 46.25 |
| Orange(standard): | 47 | 68 | 48 |
| (f) Green(high intensity ink): | 38.4 | −58.8 | 32.55 |
| Green(standard): | 50 | −68 | 25 |
| (g) Purple(high intensity ink): | 17.8 | 10.2 | −30.5 |
| Purple(standard): | 24 | 17 | −46 |

TABLE 7 indicates the grey balance percentages. CIE L*A*B* criteria, on coated paper. Spectrophotometer dry (CMY) readings are listed:

TABLE 8

| | L* |
| --- | --- |
| (75c, 66m, 66y) | |
| G7 | .97 |
| High Intensity Ink | 26.75 |
| (50c, 40m, 40y) | |
| G7 | 57.50 |
| High Intensity Ink | 49.40 |
| (25c, 19m, 19y) | |
| G7 | 75.70 |
| High Intensity Ink | 69.50 |

The TABLES 7 and 8 above describe the differences between standard (e.g., SWOP/G7) methods and the print method using the present high intensity ink formulation. The Table 7 shows that the lower the L* value, the more the ink absorbs light and the deeper or darker the color. The difference in these numbers indicate that the images/pictures being generated under SWOP/G7 method will appear much weaker and less colorful than the printed pictures generated under the present high intensity ink formulation. The present high intensity ink formulation reproduces as closely to the complete or full RGB values of every image/picture reproduced in the printing industry.

The SWOP/G7 methods and technologies have never been able to accurately reproduce RGB pictures without using additional spot colors incorporated with the CMYK values. However, even when this color augmentation is applied, the detail, contrast, and color values of the image are still compromised. When using the present high intensity ink formulation and method, on the other hand, not only are truer RGB color values reached, but the detail and the contrast embedded in all images/pictures are enhanced.

The present high intensity ink formulation allows the printing industry to reproduce the RGB color gamete created by cameras or other digital processing equipment. With the present high intensity ink formulation and method, a new color space which is larger and more complete, having logarithmically more color space values than previously known or attempted with current inks and methods. The present high definition method creates higher densities in the primary colors plus black to create a larger color space chart.

In order to achieve high intensity ink or these high density pigment values, the pigment load in the ink is increased. When the pigment load in an ink is increased, the varying shades of color from that base pigment is exponentially increased. Thus, the combination of higher pigment load plus a larger color space allows one to print a reproduction in truer color than currently is possible. In other words, densities of pigments, such as yellow, magenta, cyan, and black are included in the inks, creating color which is perceived more strongly with less dots per area than currently available inks; thus, when more dots per area are added, the color becomes even more intense. Such intensity had before only been possible by thickening the ink film over the area.

Exemplary embodiments of the formulations for the high density, high intensity ink process colors are shown below. These formulations of the present high intensity ink formulation are shown in comparison to the standard process color formulations. The increase in pigment density in the present high intensity ink formulations from standard to the present high intensity ink color formulation is exponential. In addition, the tack values for the present high intensity ink colors are decreased, while the viscosity for each has also decreased, allowing for faster drying times. The percentages (%) indicated below are weight percent of each constituent relative to the total weight of the wet ink.

TABLE 9

| High Intensity Process Yellow Ink Tack: 11-13 | | Process Yellow (Standard) | |
| --- | --- | --- | --- |
| Viscosity: 170-220 | | Tack: 11-14 | |
| Raw Materials | Percent | Raw Materials | Percent |
| Letdown Varnish | 54.00% | Letdown Varnish/ Grinding Varnish | 69.00% |
| Dispersion Oil | 15.00% | Alkyds & Aliphatic Solvents | 14.00% |
| Yellow Pigment | 22% | Yellow Pigment | 11-12% |
| Wax Compound 8% | 8.00% | Wax Compound | 4.00% |
| Drier Compound | 1.00% | Driers | 1.00% |
| Total | 100.00% | Total | 100.00% |

| High Intensity Process Magenta Ink Tack: 14-16 | | Process Magenta (Standard) | |
| --- | --- | --- | --- |
| Viscosity: 170-220 | | Tack: 16-18 | |
| Raw Materials | Percent | Raw Materials | Percent |
| Letdown Varnish | 55.00% | Letdown Varnish/ Grinding Varnish | 68.00% |
| Dispersion Oil | 13.00% | Alkyds & Aliphatic Solvents | 12.00% |
| Red Pigment | 23.00% | Red Pigment | 13-15% |
| Wax Compound 8% | 8.00% | Wax Compound | 4.00% |
| Drier Compound | 1.00% | Driers | 1.00% |
| Total | 100.00% | Total | 100.00% |

| High Intensity Process Cyan Ink Tack: 16-18 | | Process Cyan (Standard) | |
| --- | --- | --- | --- |
| Viscosity: 170-220 | | Tack: 18-20 | |
| Raw Materials | Percent | Raw Materials | Percent |
| Letdown Varnish | 57.00% | Letdown Varnish/ Grinding Varnish | 70.00% |
| Dispersion Oil | 12.00% | Alkyds & Aliphatic Solvents | 12.00% |
| Blue Pigment | 22.00% | Blue Pigment | 12-14% |
| Wax Compound 8% | 8.00% | Wax Compound | 4.00% |
| Drier Compound | 1.00% | Driers | 1.00% |
| Total | 100.00% | Total | 100.00% |

| High Intensity Process Black Ink Tack: 15-17 | | | |
| --- | --- | --- | --- |
| Viscosity: 170-220 | | Process Black (Standard) | |
| Raw Materials | Percent | Raw Materials | Percent |
| Letdown Varnish | 57.00% | Letdown Varnish/ Grinding Varnish | 64.00% |
| Dispersion Oil | 12.00% | Alkyds & Aliphatic Solvents | 13.00% |
| Alkali Blue Pigment | 5.00% | Alkali Blue Pigment | 1-2% |
| Carbon Black Pigment | 17.00% | Carbon Black Pigment | 15-17% |
| Wax Compound 8% | 8.00% | Wax Compound | 4.00% |
| Drier Compound | 1.00% | Driers | 1.00% |
| Total | 100.00% | Total | 100.00% |

The present method of matching the CIE L*A*B* values of the Pantone Matching System color chips, or any color chip, using CMYK color model is accomplished using the formulation of the inks of the present high intensity ink formulation creating a more accurate representation of the subject to be printed than other comparable methods.

All patents referred to herein, are incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present high intensity ink formulation. It is to be understood that no limitation with respect to the specific embodiments illustrated is intended or should be inferred. The disclosure is intended to cover by the appended claims all such modifications as fall within the scope of the claims.

What is claimed is:

1. A high intensity ink solution comprising:
a letdown varnish, wherein the letdown varnish is present in a concentration of about 50% to 58% by weight of the ink solution;
a dispersion oil, wherein the dispersion oil is present in a concentration of about 8% to 15% by weight of the ink solution;
a yellow pigment, wherein the yellow pigment is present in a concentration of about 18% to 25% by weight of the ink solution;
a wax compound wherein the wax compound is present in a concentration of about 4% to 10% by weight of the ink solution; and
a drier compound wherein the drier compound is about 1%-3% by weight of the ink solution, and wherein the high intensity ink has a viscosity of about 170-220, a tack of about 11-13 and a densitometer reading of about 1.15 to about 1.40.

2. The high intensity ink of claim 1 wherein the letdown varnish is about 54%-58% by weight and the yellow pigment is about 18%-23% by weight of the ink solution.

3. The high intensity ink of claim 1 having an L* value, an A* value, and a B* value of about 84.5, 3.35, and 108 respectively.

4. A high intensity ink solution comprising:
a letdown varnish, wherein the letdown varnish is present in a concentration of about 50% to 58% by weight of the ink solution;
a dispersion oil, wherein the dispersion oil is present in a concentration of about 8% to 15% by weight of the ink solution;
a red pigment, wherein the red pigment is present in a concentration of about 18% to 25% by weight of the ink solution;
a wax compound wherein the wax compound is present in a concentration of about 4% to 10% by weight of the ink solution; and
a drier compound wherein the drier compound is about 1%-3% by weight of the ink solution, and wherein the high intensity ink has a viscosity of about 170-220, a tack of about 14-16, and a densitometer reading of about 1.70 to about 2.10.

5. The high intensity ink of claim 4 having an L* value, an A* value, and a B* value of about 40.2, 68.9, and 18.55 respectively.

6. A high intensity ink solution comprising:
a letdown varnish, wherein the letdown varnish is present in a concentration of about 50% to 58% by weight of the ink solution;
a dispersion oil, wherein the dispersion oil is present in a concentration of about 8% to 15% by weight of the ink solution;
a blue pigment, wherein the blue pigment is present in a concentration of about 18% to 25% by weight of the ink solution;
a wax compound wherein the wax compound is present in a concentration of about 4% to 10% by weight of the ink solution; and
a drier compound wherein the drier compound is about 1%-3% by weight of the ink solution,
and wherein the high intensity ink includes a viscosity of about 170-220 and a tack of about 16-18.

7. The high intensity ink of claim 6 having a densitometer reading of about 1.65 to about 2.10.

8. The high intensity ink of claim 6 having an L* value, an A* value, and a B* value of about 49.5, −41.5, and −50.5 respectively.

9. A high intensity ink for process black having a viscosity of about 170-220 and a tack of about 15-17 comprising:
a letdown varnish present in a concentration of about 54%-58% by weight of the ink solution;
a dispersion oil of about 8%-15% by weight of the ink solution;
an alkali blue pigment of about 3%-6% by weight of the ink solution;
a carbon black pigment of about 17%-20% by weight of the ink solution;
a wax compound of about 4%-10% by weight of the ink solution; and
a drier compound of about 1%-3% by weight of the ink solution.

10. The high intensity ink for process black of claim 9 having a densitometer reading of about 1.80 to about 2.20.

11. The high intensity ink for process black of claim 9 having an L* value, an A* value, and a B* value of about 10.25, −1.45, and −3.50 respectively.

* * * * *